United States Patent [19]
Fraiture

[11] 3,899,928
[45] Aug. 19, 1975

[54] ATTITUDE MEASUREMENT SYSTEM FOR SATELLITE

[75] Inventor: Luc F. Fraiture, Darmstadt, Germany

[73] Assignee: Organisation Europeenne de Recherches Spatiales, Neuilly-sur-Seine, France

[22] Filed: Oct. 11, 1973

[21] Appl. No.: 405,396

[30] Foreign Application Priority Data
Mar. 29, 1973 Belgium .............................. 129421

[52] U.S. Cl. ............................................. 73/178 R
[51] Int. Cl. ............................................. G01c 21/00
[58] Field of Search ..................... 73/178 R; 33/361; 324/43 L, 43 G, 43 R

[56] References Cited
UNITED STATES PATENTS
3,229,521  1/1966  Freeman ........................... 73/178 R Primary Examiner—Donald O. Woodiel
Attorney, Agent, or Firm—Hill, Gross, Simpson, Van Santen, Steadman, Chiara & Simpson

[57] ABSTRACT

In an earth satellite stabilized by rotation about a spin axis and travelling along an earth orbit, an attitude measurement apparatus comprising a slit sun sensor having its slit in a plane containing said spin axis for providing a first signal every time said plane crosses the line satellite-sun, a magnetometer disposed substantially perpendicular to said spin axis to provide a second substantially periodic signal representing the intensity of the magnetic field at the satellite position on said orbit, first means responsive to the first positive going zero crossing of said second signal to produce a third signal representing said zero crossing, and further responsive to the first negative going zero crossing of said second signal to produce a fourth signal representing the latter zero crossing, and second means responsive to said first, third and fourth signals for producing a fifth signal representing the time interval between the occurrence times of said first and third signals and for producing a sixth signal representing the time interval between the occurrence times of said first and fourth signals, the said fifth and sixth signals being available to be coupled to a suitable telemetering apparatus.

5 Claims, 5 Drawing Figures

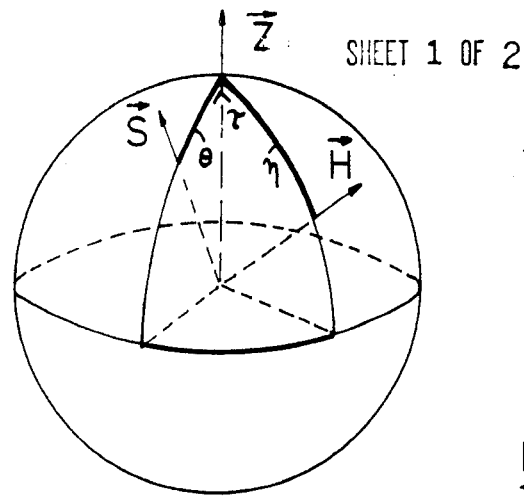
FIG.1
FIG.2
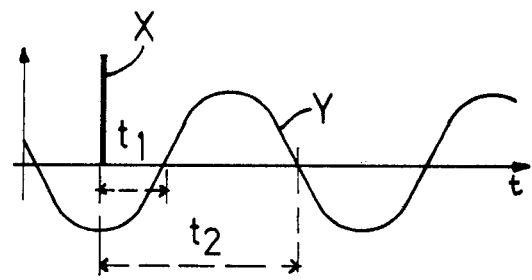
FIG.3
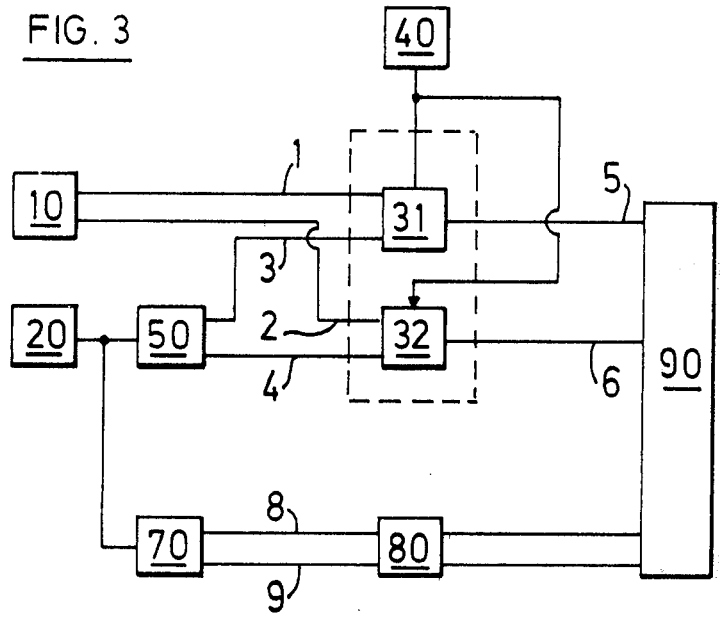

ATTITUDE MEASUREMENT SYSTEM FOR SATELLITE

The present invention relates to a sensing system for attitude measurement of a spin stabilized near earth satellite. It relates more particularly to an electronic system for measuring the azimuth angle between the sun and magnetic vectors for reconstitution of the attitude of the satellite.

The attitude of a spacecraft or space vehicle is currently measured in particular by means of one or several sun sensors which determine, among others, the times when a meridian plane of the satellite crosses the line satellite-sun, and three magnetometers mounted along three mutually orthogonal directions for defining the components of the magnetic field of the earth along the three axes of the spacecraft. These data permit to determine the attitude of the spacecraft with an accuracy of the order of one degree.

The conventional systems for measuring the attitude of a satellite, comprising magnetometers and sun sensors, provide data which do not enable the precise attitude reconstitution to be achieved when the sun vector, the earth magnetic vector and the spin vector lie in or close to a plane, e.g. in those instances where a satellite is placed on a nearly polar trajectory and is not sun synchronous.

The object of the invention is to provide a sensing system for measuring the attitude of a spin stabilized earth satellite, capable to operate with the required accuracy on any polar earth orbit at least for a very large part of each orbit.

Another object is to provide a sensing system for attitude measurement which requires only a simplified apparatus on board: one sun sensor, one magnetometer mounted substantially perpendicular to the spin axis of the satellite, and an electronic circuitry producing signals representing the value of the azimuth angle between the sun and magnetic vectors together with signals representing peak values of the magnetic field.

In the drawings:

FIG. 1 shows the parameters to be taken into consideration in the system of the invention;

FIG. 2 is a diagram helpful to explain the method used in the system of the invention;

FIG. 3 is a block-schematic of an embodiment of the invention;

Figure 4:
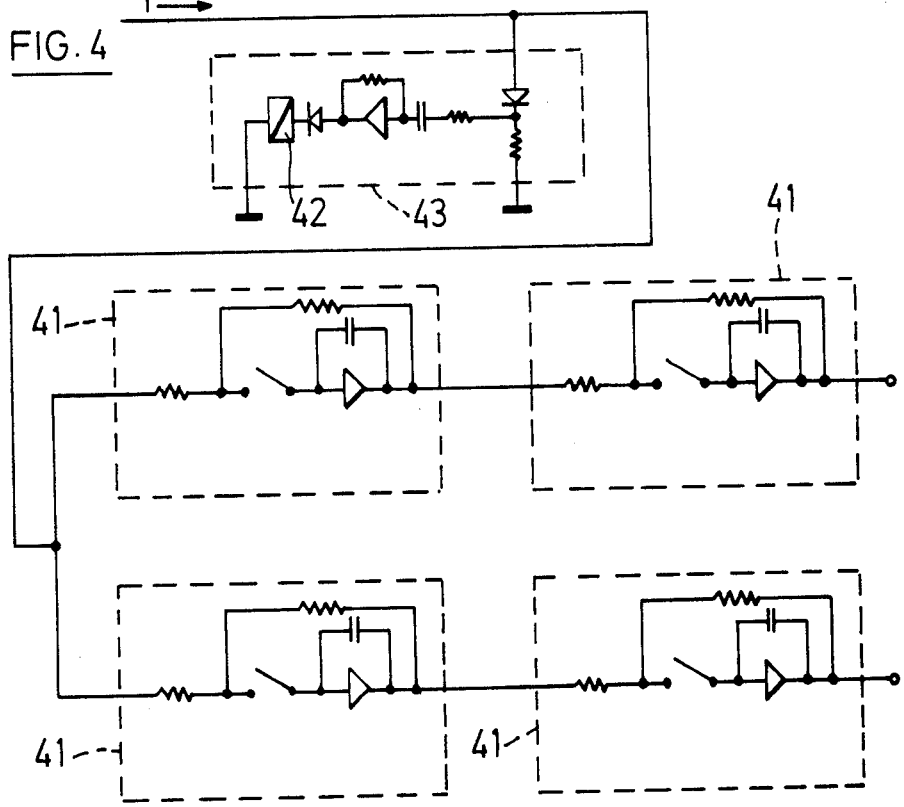
FIG. 4 illustrates an embodiment of a particular circuit arrangement used in the apparatus.

Referring first to FIG. 1 which shows the parameters to be taken into consideration in the system of the invention there is shown a unit sphere centered in the center of gravity of the satellite travelling along an earth orbit. $\vec{Z}$ represents the spin axis of the satellite, $\vec{S}$ represents the sun vector, i.e. the direction of the sun, and $\vec{H}$ represents the magnetic vector of the earth. The colatitude of the sun is designated as $\theta$, the magnetic colatitude is designated as $\eta$ and the azimuth angle is designated as $\tau$.

In a sensing system for attitude measurement in a satellite, the colatitude $\theta$ of the sun is determined from measurements by the sun sensor, and the magnetic colatitude $\eta$ is determined from measurements, by the magnetometer, of the component of the magnetic field along the spin axis. The system of the invention further determines the value of the azimuth angle $\tau$.

The system comprises a slit sun sensor, known per se, and a magnetometer having its axis perpendicular to the spin axis of the satellite.

The method used in the system will be described with reference to FIG. 2 which illustrates a signal X generated by the sun sensor and the signal Y generated by the magnetometer as a function of time $t$. Signal X is a pulse generated every time the meridian containing the slit of the sun sensor crosses the line satellite-sun. Signal Y is substantially sinusoidal and proportional to the magnetic field intensity and to the component thereof along the magnetometer axis. The system of the invention detects the occurrence time of each pulse X from the sun sensor, it then detects the first positive going zero crossing of signal Y from the magnetometer and the first negative going zero crossing of signal Y, and it produces a signal representing the time interval $t_1$ and a signal representing the time interval $t_2$. The system also provides signals representing the positive and negative peak values of signal Y.

An illustrative embodiment is shown in FIG. 3. The slit sun sensor 10 has its slit in a plane containing the spin axis of the satellite, and the magnetometer 20 is disposed substantially perpendicular to the spin axis of the satellite. The output from sun sensor 10 is coupled to inputs 1 and 2 of a counting means 30 clocked by timing pulses from clock means 40. The output from magnetometer 20 is coupled to the input of a zero crossing detector means 50. The latter comprises a shaping circuit which, in a known manner, converts the half cycles of signal Y from the magnetometer into a square waveform, and a derivator circuit which, in a known manner, produces a positive pulse at the time of each rising edge of the square waveform and a negative pulse at the time of each falling edge. The positive pulses appear at a first output and the negative pulses appear at a second output. Said outputs are coupled to inputs 3 and 4, respectively, of counting means 30.

In this illustrative embodiment, the counting means 30 comprises two synchronous counters 31 and 32. These counters are started by signal X from sun sensor 10 applied to inputs 1 and 2. The first counter 31 accepts at its second input 3 the signal from a first output of zero crossing detector 50, the second counter 32 accepts at its second input 4 the signal from the second output of detector 50. Each counter, once started, advances under control of the timing signals from clock means 40 until it is stopped by a pulse applied to its second input. Thus counter 31 stops when a positive pulse is applied to its input 3 and counter 32 stops when a negative pulse is applied to its input 4. The contents of counter 31 represents the time interval $t_1$ from the time of signal X to the time of the first positive going zero crossing of signal Y. The output signals from counters 31 and 32, i.e. the digital signals representing $t_1$ and $t_2$ at outputs 5 and 6, are then directed to a suitable telemetering apparatus, known per se, represented by block 90 in the drawing. The telemetering words representing $t_1$ and $t_2$ enable the value of azimuth angle $\tau$ to be determined. The apparatus described above provides in an indirect yet simple manner a measurement of the azimuth angle between the sun and magnetic vectors.

In addition to the apparatus as described above, there may be provided a holding circuit means 70 to maintain separate from one another the positive and negative peak values of the output signal from magnetometer 20. The most simple embodiment for the holding circuit means comprises a peak voltage rectifier circuit. Such a circuit produces R-C loss and has only a relatively low accuracy in space applications. A more advantageous embodiment to this purpose uses one or two sample/hold amplifiers in cascade for each of the two peak polarities. FIG. 4 illustrates a circuit arrangement comprising two amplifiers 41 in each path serially connected with a peak voltage rectifier 43. Using two sample/hold amplifiers in cascade makes it possible to obtain an high accuracy. The circuit of such amplifiers is known in the art. The switch 44 of the first amplifier in one path is controlled by a magnet 42 inserted in the circuit of a peak voltage rectifier 43. The corresponding switch 45 in the parallel path is adapted to be closed when the first switch is open.

The analog values at outputs 8 and 9 of the holding circuit 70 (see FIG. 3) are converted into digital values by the analog-to-digital converter 80 which feeds the telemetering apparatus 90. These values are used to determine the value of the magnetic colatitude $\eta$.

The holding circuit 70 can also be in digital form provided it is preceded by an analog-to-digital converter. However, this solution is more expensive than the analog embodiments and does not provide an higher accuracy than the cascade arrangement of sample/hold amplifiers in the present state of the active circuit technology.

The system as described above permits measurement of the attitude of a satellite to be made with only one sun sensor and one magnetometer on board the space vehicle.

Figure 5:
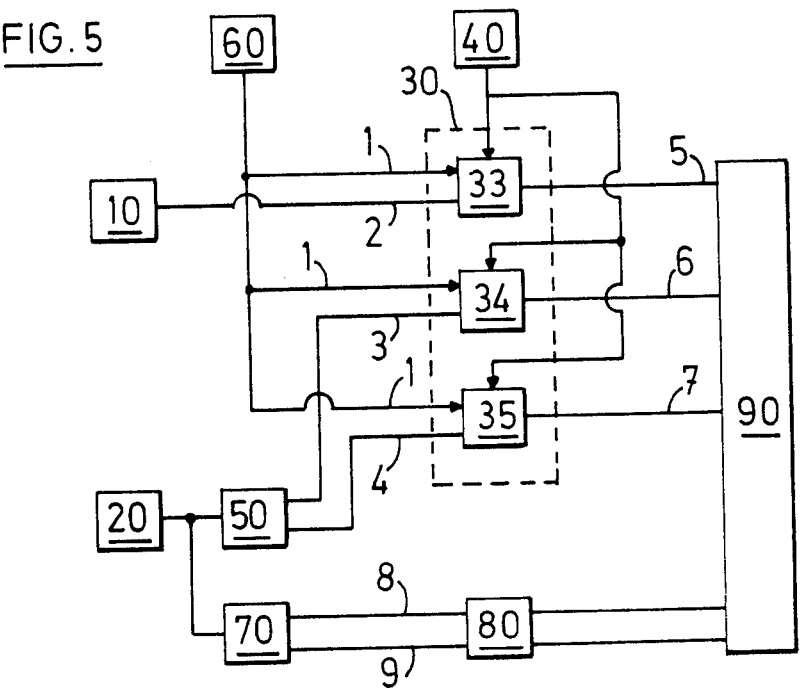
FIG. 5 is a block-schematic of an alternative embodiment of the invention.

FIG. 5 schematically illustrates an alternative embodiment. The counting means 30 here comprises three counters 33, 34 and 35 which advance synchronously under control of timing signals from clock means 40. These counters are started by a signal generated by clock means 60 which may be synchronized with the telemetry format. Said clock means thus has a low frequency rate with e.g. a period of about a few seconds. This arrangement permits the measurement to be related to an internal event of the satellite, e.g. the starting time of a telemetry format.

When counters 33, 34 and 35 are started, the first one advances under control of clock means 40 until it is stopped in response to a signal X from sun sensor 10 to its input 2. The second counter 34 advances synchronously until it is stopped in response to the application to its input 3 of a signal from a first output of zero crossing detector 50. The third counter 35 advances synchronously until it is stopped in response to the application to its input 4 of a signal from the second output of detector 50. The counters 33, 34 and 35 thus produce at outputs 5, 6 and 7, respectively, signals representing the time intervals elapsed from a reference time defined by the clock signal applied to inputs 1 to the times of the signals applied to inputs 2, 3 and 4, respectively. The time intervals $t_1$ and $t_2$ can then be derived by subtracting in the telemetering apparatus, the signal at output 5 from the signals at outputs 6 and 7, respectively, or by telemetering the outputs 5, 6 and 7 to the ground.

As compared with conventional systems, the measuring system of the invention has several advantages. It ensures a better digital stability of the attitude reconstitution as a result from the determination of the azimuth angle $\tau$. In the conventional systems, the attitude reconstitution fails due to digital inaccuracy when vectors $\vec{Z}$, $\vec{S}$ and $\vec{H}$ are substantially in or close to the same plane, thereby resulting in a substantial reduction of the operation flexibility of the satellite during relatively long periods of time (several hours or even several days).

In addition, this system has a very large working area for any near earth spin stabilized satellite whose spin axis is not pointing to the sun. In fact, the working solid angle is substantially only limited by the field of view of the slit sun sensor.

Lastly, this system permits correction of the attitude reconstitution by direct bias determination. These biases are due to variations of the magnetic environment within the satellite. Such variations are known to produce a zero shift of the magnetometer. Designating the shift error by $d$ and the true peak amplitude of the magnetometer output by A, the signals appearing at outputs 8 and 9 represent $(A+d)$ and $-(A-d)$, respectively. Considering a relatively short time interval, the magnetometer output is a signal in the form $$X(t) = A \sin \left( \frac{2\pi}{T} t + \phi \right) + d$$

where T represents the spinning period of the satellite
  $t$ represents the time elapsed since the last pulse from the sun sensor
  $\phi$ represents the signal phase.

Designating the output from counter 30 by $n_1$, the output from counter 40 by $n_2$ and the time interval between two successive clock pulses by $\mu$, the argument of the sines function in the above equation is $\pi/2$ at a moment just intermediate between $\mu n_1$ and $\mu n_2$. This gives $$\frac{2\pi}{T} \frac{\mu(n_1 + n_2)}{2} + 0 = \frac{\pi}{2}$$

with any value for $d$.

The spinning period T and the phase angle $\phi$ are determined from the preceding equation and one of the following:

$$X(\mu n_1) = 0 \qquad X(\mu n_2) = 0.$$

The values of $n_1$ and $n_2$ need a correction $\pm\Delta$. If $d$ is zero, the time $2\mu(n_2-n_1)$ is equal to one half period of signal $X(t)$. The correction $\pm\Delta$ thus is computed with the following equation:

$$\frac{2\pi}{T} \mu(n_2 - n_1) - \pi = \pm 2\Delta \frac{2\pi}{T}$$

where the sign in the second member is chosen negative when $n_1 < n_2$ and $0 < d$ or when $n_2 < n_1$ and $d < 0$.

What is claimed is:

1. In an earth satellite stabilized by rotation about a spin axis and travelling along an earth orbit, an attitude measurement apparatus comprising a slit sun sensor having its slit in a plane containing said spin axis for providing a first signal every time said plane crosses a line satellite-sun, a magnetometer disposed substantially perpendicular to said spin axis to provide a second signal being substantially sinusouidal about an axis centered at zero and having a first positive going zero crossing and a first negative going zero crossing, said second signal representing the intensity of the magnetic field at the satellite position on said orbit, first means responsive to the first positive going zero crossing of said second signal to produce a third signal representing said positive going zero crossing, and further responsive to the first negative going zero crossing of said second signal to produce a fourth signal representing said first negative going zero crossing, and second means responsive to said first, third and fourth signals for producing a fifth signal representing the time interval between the occurence times of said first and third signals and for producing a sixth signal representing the time interval between the occurrence times of said first and fourth signals, the said fifth and sixth signals being available to be coupled to a suitable telemetering apparatus.

2. An attitude measurement apparatus according to claim 1, wherein said second means comprises a counting means timed by a clock means, said counting means being started by a command signal to produce said fifth signal in response to sensing the application of said third signal and to produce said sixth signal in response to sensing the application of said fourth signal.

3. An attitude measurement apparatus according to claim 2, wherein said command signal is the first signal.

4. An attitude measurement apparatus according to claim 1, wherein said first means comprises a square shaping circuit in tandem with a derivator circuit to produce a positive pulse in response to the occurrence of the rising edge of every half wave and a negative pulse in response to the occurrence of the falling edge of every half wave.

5. An attitude measurement apparatus according to claim 1, further comprising means to hold the positive and negative peak values of said second signal, the positive values being available at a first output and the negative values being available at a second output, said first and second outputs being adapted to be connected to a suitable measuring apparatus.

* * * * *